June 27, 1933.  G. SCHLATTER  1,916,077
MOUNTING OF VEHICLE SPRINGS
Filed April 21, 1931
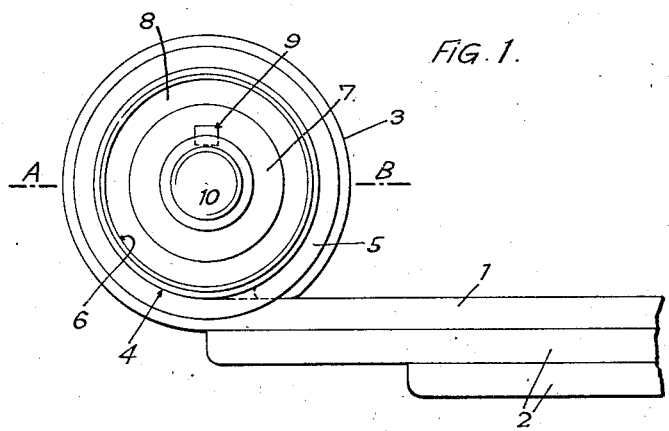
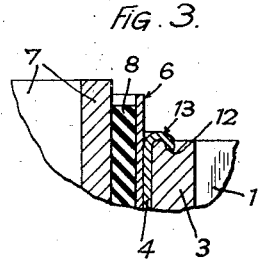
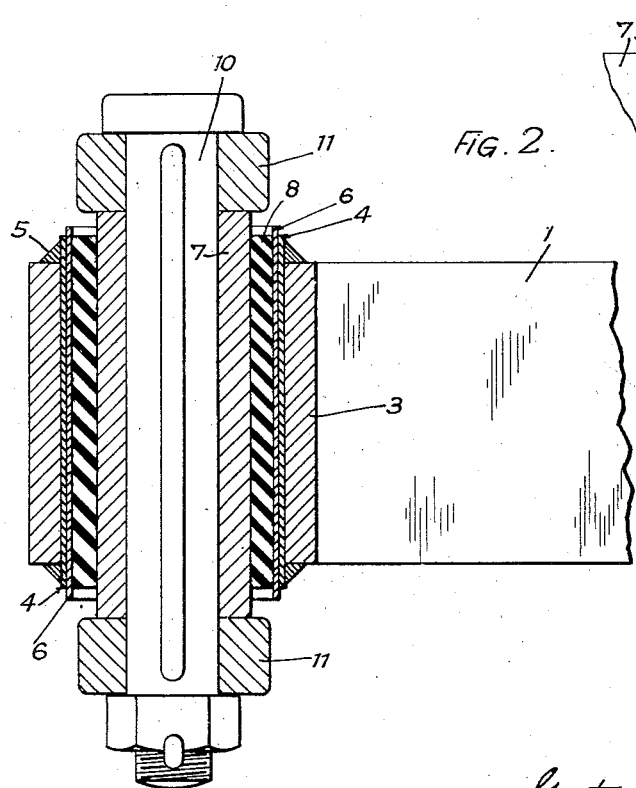
Inventor:
Gustav Schlatter
By B. Dommers Patented June 27, 1933

1,916,077

UNITED STATES PATENT OFFICE

GUSTAV SCHLATTER, OF STEINACH, NEAR ARBON, SWITZERLAND

MOUNTING OF VEHICLE SPRINGS

Application filed April 21, 1931, Serial No. 531,801, and in Germany April 23, 1930.

The present invention relates to the mounting of vehicle springs and particularly to damping means provided in the eyes of leaf springs in order to prevent rattling. Means of this kind in the form of bushings are known as "silent blocs". This bushing ordinarily comprises two telescoped metal sleeves spaced apart for accommodating a rubber lining therebetween. The inner metal sleeve of the silent bushing is keyed to the pin bolt of the spring which is connected to the vehicle frame. These anti-rattling or silent bushings have a shock absorbing effect and permit of dispensing with lubricating the bolt of the spring.

Heretofore it was customary to simply press the silent bushings into the eyes of the leaf springs. When the silent bushing has but a small diameter, this manner of fastening suffices for securing the bushing in the eye of the leaf spring. If, however, the exterior diameter of the bushing exceeds a certain extent the springiness of the eye of the spring is no longer sufficient to prevent the pressed-in bushing from shifting relatively to the eye i. e. the silent bushing exerts a certain unwinding effect on the eye of the spring thus working loose and tending to shift in the axial direction.

In order to eliminate this drawback the silent bushing according to the invention is jointed with the eye of the spring by the aid of fastening means, for example welded seams, suchwise, that the eye is prevented from opening. The arrangement according to the invention offers the advantage that even with silent bushings of a relatively large exterior diameter a firm connection between the bushing and the eye of the spring is ensured. When the silent bushing is constructed as two telescoped sleeves interleaved with a rubber lining or padding suitably, according to the invention between the exterior sleeve of the bushing and the eye of the spring a separate sleeve is inserted which is rigidly connected to the eye of the spring by the fastening means, for example by welded seams. This arrangement offers the advantage, particularly when the silent bushing is jointed with the eye of the spring by welded seams, that damaging of the interposed rubber padding is avoided in that the welding of the separate sleeve to the eye of the spring can be effected before the padded bushing is pressed in. In this manner destroying of the rubber padding during the welding operation is prevented.

In the drawing the arrangement according to the invention is illustrated in two modified forms and by way of example only, in which Fig. 1 is a side elevation of the eye of a leaf spring with the padded bushing inserted, Fig. 2 is a section on the line A—B in Fig. 1, and Fig. 3 is a detail of a modification of the arrangement.

The end of the uppermost leaf 1 of a laminated spring 2 comprising several leaves is rolled up to form an eye 3 for the spring. Into this eye a steel sleeve 4 is pressed and firmly jointed at both ends with the eye 3 of the spring by welded seams 5. Into the sleeve 4 a padded bushing or so-called "silent bloc" of known construction is pressed. This padded bushing consists of an exterior steel sleeve 6, an interior steel sleeve 7 which is inserted into the exterior sleeve so as to form a hollow space between the two sleeves into which a rubber lining or padding 8 is pressed. The exterior sleeve 6 of the padded bush is firmly held in the sleeve 4 by the considerable amount of friction action caused by pressing said sleeves under exertion of great pressure in one another. The inner sleeve 7 is keyed by means of the groove 9 for the reception of a spline to the bolt 10 of the spring, which is connected to the vehicle frame by the shackle 11.

As in the described arrangement between the padded bushing 6, 7, 8 and the eye 3 of the spring a closed steel sleeve 4 is inserted, which is welded to the eye of the spring, the latter is prevented from opening or unwinding, whereby a firm grip of the eye of the spring on the padded bushing is ensured.

Alternatively, the separate steel sleeve 4 instead of being welded to the eye 3 at its ends may be connected thereto by soldering or the like. Or the steel sleeve 4, as shown in Fig.

3, may be rigidly jointed at each end with the eye 3 by means of a bead 13 clampingly engaging in a groove 12 in the respective end face of the eye.

When a beaded connection between the sleeve 4 and the eye 3 of the above-described type is used, the separate steel sleeve 4 can be dispensed with and the exterior sleeve 6 of the padded bushing directly connected to the eye 3 of the spring by beading its edges in the manner shown in Fig. 3.

I claim:

1. In a mounting for vehicle springs, a vehicle frame, a pin secured to said frame, a laminated spring, an eye at the end of said spring and surrounding said pin, an elastic joint inserted between said pin and said eye and secured to said eye around the entire circumferential ends thereof, whereby opening or uncoiling of said eye is prevented.

2. In a mounting for vehicle springs, a vehicle frame, a pin secured to said frame, a laminated spring, an eye at the end of said spring and surrounding said pin, an elastic joint inserted between said pin and said eye, a separate sleeve interposed between said joint and said eye and welded to said eye around the entire circumferential ends thereof whereby opening or uncoiling of said eye is prevented.

3. In a mounting for vehicle springs, a vehicle frame, a pin secured to said frame, a laminated spring, an eye at the end of said spring and surrounding said pin, an elastic joint inserted between said pin and said eye, a separate sleeve interposed between said joint and said eye and soldered to said eye around the entire circumferential ends thereof, whereby opening or uncoiling of said eye is prevented.

4. In a mounting for vehicle springs, a vehicle frame, a pin secured to said frame, a laminated spring, an eye at the end of said spring and surrounding said pin, the end faces of said eye being provided with a groove, an elastic joint inserted between said pin and said eye, a separate sleeve interposed between said joint and said eye and the ends of which are upturned, said upturned ends engaging said grooves, whereby opening or uncoiling of said eye is prevented.

5. In a mounting for vehicle springs, a vehicle frame, a pin secured to said frame, a laminated spring, an eye at the end of said spring and surrounding said pin, the end faces of said eye being provided with a groove and an elastic joint inserted between said pin and said eye and comprising an outer sleeve, an inner sleeve and an intermediate rubber insert, the ends of said outer sleeve being upturned and engaging said grooves, whereby opening or uncoiling of said eye is prevented.

In testimony whereof I have signed my name to this specification.

GUSTAV SCHLATTER.